(12) United States Patent
Storiale (10) Patent No.: US 10,977,635 B2
(45) Date of Patent: Apr. 13, 2021

(54) USER-CONTROLLED TRANSACTION AUTHORIZATION

(71) Applicant: NCR Corporation, Duluth, GA (US)

(72) Inventor: Michael John Storiale, Rocky Hill, CT (US)

(73) Assignee: NCR Corporation, Atlanta, GA (US)

( * ) Notice: Subject to any disclaimer, the term of this patent is extended or adjusted under 35 U.S.C. 154(b) by 150 days.

(21) Appl. No.: 15/420,036

(22) Filed: Jan. 30, 2017

(65) Prior Publication Data
US 2018/0218366 A1 Aug. 2, 2018

(51) Int. Cl.
*G06Q 20/20* (2012.01)
*G06Q 40/00* (2012.01)

(52) U.S. Cl.
CPC ........... *G06Q 20/202* (2013.01); *G06Q 40/00* (2013.01)

(58) Field of Classification Search
CPC ............................ G06Q 20/405; G06Q 20/202
USPC .......................................................... 705/21
See application file for complete search history.

(56) References Cited

U.S. PATENT DOCUMENTS

| | | | | |
|---|---|---|---|---|
| 8,255,330 B2 * | 8/2012 | Cameo | ................... | G06Q 20/10 705/44 |
| 8,401,904 B1 * | 3/2013 | Simakov | ............ | G06Q 20/3572 705/16 |
| 2002/0029200 A1 * | 3/2002 | Dulin | ...................... | G06F 21/33 705/67 |
| 2003/0101134 A1 * | 5/2003 | Liu | .......................... | G06Q 20/04 705/39 |
| 2011/0185170 A1 * | 7/2011 | Sudhakar | ............... | H04L 9/321 713/155 |
| 2012/0061464 A1 * | 3/2012 | Kingston | .............. | G07F 19/203 235/379 |
| 2012/0185389 A1 * | 7/2012 | Ross | ...................... | G06Q 20/40 705/44 |
| 2012/0239564 A1 * | 9/2012 | Summerrow | .......... | G06Q 20/28 705/41 |
| 2013/0225075 A1 * | 8/2013 | Schmid | ................... | G06Q 20/12 455/41.1 |
| 2013/0256403 A1 * | 10/2013 | MacKinnon Keith | ... | G06K 5/00 235/375 |
| 2014/0337150 A1 * | 11/2014 | Anand | .................. | G06Q 20/045 705/16 |
| 2017/0323299 A1 * | 11/2017 | Davis | ............... | G06Q 20/40145 |
| 2018/0060843 A1 * | 3/2018 | Maheshwari | .......... | G06Q 50/01 |

* cited by examiner

*Primary Examiner* — Florian M Zeender
*Assistant Examiner* — Nicole Elena Bruner
(74) *Attorney, Agent, or Firm* — Schwegman, Lundberg & Woessner (57) ABSTRACT

A pre-defined condition for a pending transaction is satisfied. In response, a real-time request for authorizing the pending transaction is sent to an interested party of the pending transaction. Based on a response received from the interested party, a notice is sent to a Point-Of-Sale (POS) terminal indicating whether the pending transaction was authorized and completed or denied.

15 Claims, 5 Drawing Sheets

USER-CONTROLLED TRANSACTION AUTHORIZATION

BACKGROUND

Customers are often frustrated by fees levied by their financial institutions while at the same time these institutions rely on the fees as substantial revenue streams for maintaining their businesses. In fact, customers frequently switch financial institutions because of their displeasure with various fees.

As one example, consider bank overdraft fees where a bank levies a fee when a consumer exceeds his/her balance in an account during a transaction. There has been significant political backlash over these type of fees in the industry. As a result, laws and regulations now require banks to by default to not allow overdrafts on consumer accounts unless the consumer specifically authorizes overdrafts at the time of account creation and is properly made aware of the bank's fees. This becomes a binary choice for the consumer to either permit overdraft transactions or not permit such transactions.

The irony is that most consumers in any given transaction would probably want their transactions to be authorized at a retailer than be unable to purchase the item or service associated with the transaction. Moreover, many consumers have more than one account with their banks, such that when an account lacks sufficient funds for a given transaction, a different account by the consumer that is not tied to the consumer's debit card has sufficient funds to cover the transaction.

The real problem is that the consumers do not keep track of their account balances in real time and because the banking fees for overdrafts can be compounded as long as an account is running a negative balance, the fees at the end of a month can be devastating and shocking to the consumers. However, if consumers were provided more timely information about such transactions and given control over such transactions, consumers would likely authorize overdrafts and take care of any negative balances in a more timely fashion. In fact, the consumers would likely also not complain to the media and their political representatives over these fees. Essentially, consumers really just want control and timely information from their financial institutions with respect to their accounts and if provided the consumers would become more loyal to their banks and the banks could collect reasonable fees to sustain their revenues; win for consumers and a win for the financial institutions.

SUMMARY

In various embodiments, methods and systems for user-controlled transaction authorization processing are presented.

According to an embodiment, a method for user-controlled transaction authorization is provided. Specifically, in an embodiment, a request is received from a terminal and a condition associated with satisfying the request is identified. Next, a notification is sent to a party for authorizing the request based on information associated with the condition. Finally, the terminal is provided a status based on a response received from the party.

DETAILED DESCRIPTION

Figure 1A:
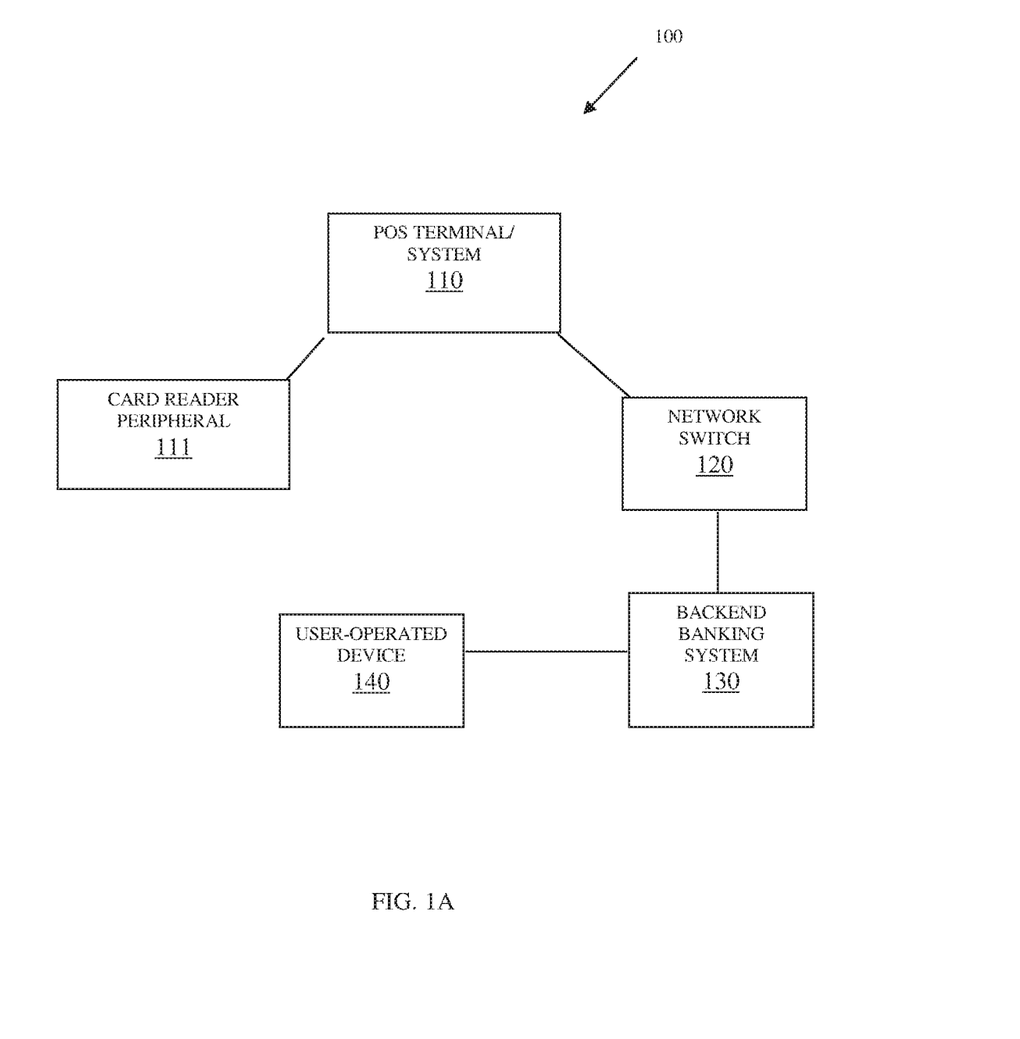
FIG. 1A is a diagram of a system user-controlled transaction authorization processing, according to an example embodiment.

FIG. 1A is a diagram of a system 100 user-controlled transaction authorization processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the user-controlled transaction authorization processing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for user-controlled transaction authorization processing can be implemented in all, or some combination of the components shown in different hardware computing devices having one or more hardware processors.

The system 100 includes: 1) a Point-Of-Sale (POS) terminal 110 having a card reader peripheral 111, a network switch 120, a backend banking system 130, and a user-operated device 140.

During a typical retail transaction, a user presents a payment card (such as a debit card), which is read by a card reader peripheral and a POS terminal routes the transaction data for a transaction and card details read from the card to a network switch. The network switch routes the information to a backend banking system. The banking system determines an account for the consumer lacks sufficient funds and determines whether the consumer is enrolled in overdraft protection. If the consumer is enrolled, the transaction is approved and appropriate fees are charged to the consumer, and the backend banking system notifies the POS terminal that payment was made to the retailer associated with the POS terminal. If the consumer is not enrolled in overdraft protection, the transaction is denied and the POS terminal is notified of non-payment.

This typical processing flow for overdraft transactions are modified herein and below as noted and described in the FIG. 1B.

As used herein, the terms: "consumer," "user," and "customer" may be used interchangeably and synonymously with one another. Moreover, the phrase "overdraft protection" is intended to mean a retail transaction where the amount owed as payment by the consumer for the transaction exceeds and available balance that the consumer has in an account with a financial institution. A "payment card" is intended to mean a debit or credit card used as payment for a transaction that includes card data that identifies an account of the consumer with a financial institution.

Figure 1B:
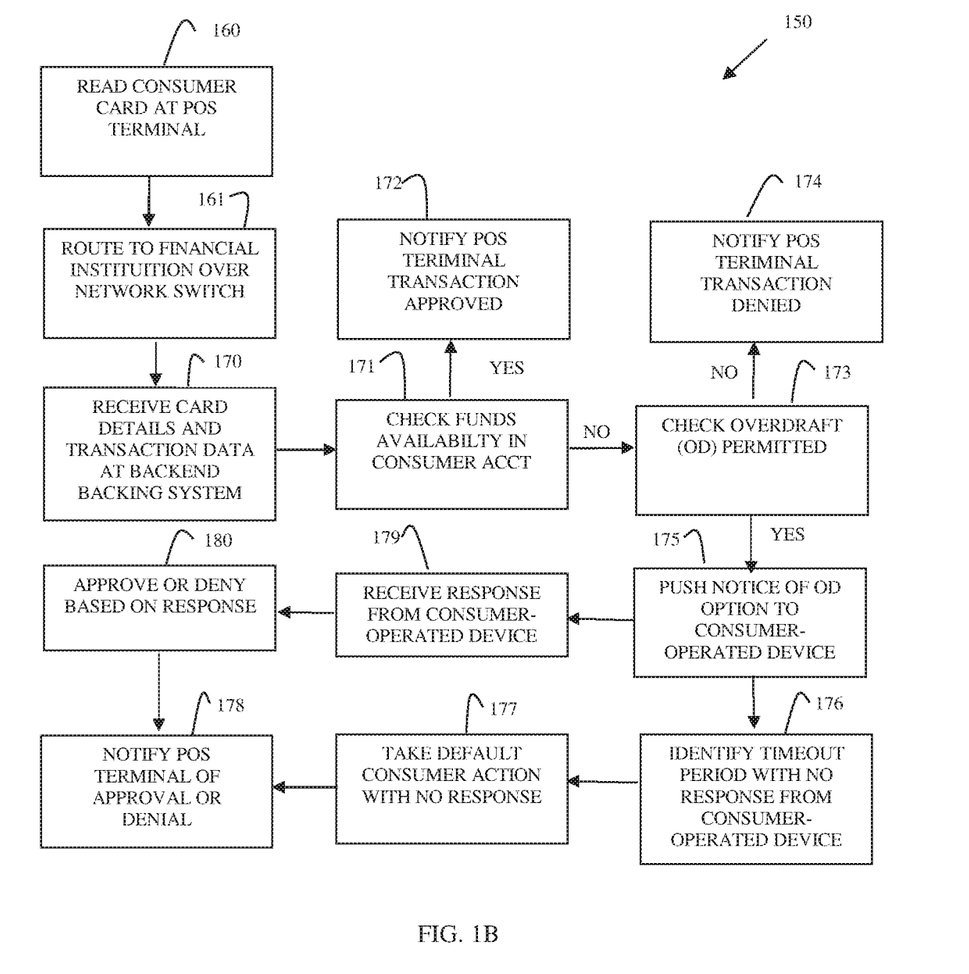
FIG. 1B is a diagram depicting a method for overdraft processing using the system of the FIG. 1A, according to an example embodiment.

FIG. 1B is a diagram depicting a method 150 for overdraft processing using the system of the FIG. 1A, according to an example embodiment.

At 160, a payment card is read by the card reader peripheral 111 at the POS terminal 110 for purposes of providing payment for a retail transaction being conducted at a retailer associated with the POS terminal 110.

At 161, the transaction data for the transaction and the card data for the card are routed to the network switch 120 from the POS terminal 110 for purposes of obtaining payment by the retailer for the transaction.

At 170, the backend banking system 130 receives the card data and the transaction data from the POS terminal 110 through the network switch 120.

At 171, the backend banking system 130 checks to determine whether the account for the consumer (based on the card data received) has an available balance of funds that exceeds or equals the transaction amount (based on the transaction data) needed for payment by the consumer to the retailer for the transaction.

At 172, when the backend banking system 130 determines that the account has sufficient funds for the transaction, the backend banking system 132 debits the account by the transaction amount, credits a retailer account by the transaction amount, and notifies the POS terminal 110 that payment was made by the consumer to the retailer for the transaction. At this point, the transaction concludes.

At 173, when the backend banking system 130 determines that the account has an available balance that will be negative if payment is made for the transaction amount, the backend banking system 130 checks to determine whether the consumer is enrolled in overdraft protection services with the bank associated with the backend banking system 130.

At 174, when the backend banking system 130 determines that the consumer is not enrolled in overdraft protection service with the bank, the backend banking system 130 notifies the POS terminal 110 that payment cannot be made and that the transaction should be denied.

Optionally and assuming laws and regulations permit, the backend banking system 130 may send a request to the consumer-operated device 140 asking whether the consumer wishes to enroll for overdraft protection services with the bank. Here, the consumer can in real time enroll in the overdraft protection services and the processing would proceed similar to what is discussed at 175.

At 175, when the backend banking system 130 determines that the consumer is enrolled in overdraft protection service with the back, the backend banking system 130 pushes a notification message to the consumer-operated device 140. This notification can include a variety of information and in some cases, as discussed below, options for the consumer to successfully proceed with the transaction using the overdraft protection services. For example, the notification may inform the consumer that overdraft protection services will be triggered for the transaction amount if approved by the consumer and may provide the available account balance for the consumer's account.

At 176, when the backend banking system 130 determines that the consumer did not respond to the push notification sent at 175 within a preconfigured period of elapsed time, the backend banking system 130, at 177, determines whether to proceed with overdraft protection and allow payment for the transaction or whether to deny the payment based on a default action (set by the consumer in a profile setting for the consumer) as a default course of action desired by the consumer when the consumer fails to respond to a push notification. At 178, the default action (approve or deny the payment for the transaction) is communicated by the backend banking system 130 to the POS terminal 110.

At 179, when a response is received to the push notification by the backend banking system 130, the backend banking system 130 performs the action, at 180, and communicates whether the action was an approval of the transaction payment or a denial of payment to the POS terminal 110, at 178.

One now appreciates how the enhanced processing reflected at 175-180 provides real-time control to the consumer for overdraft protection, which heretofore has been unavailable in the industry.

In an embodiment, the POS terminal 110 is a Self-Service Terminal (SST). In and embodiment, the SST is an Automated Teller Machine (ATM). In an embodiment, the SST is a kiosk.

In an embodiment, the POS terminal 110 is a cashier or clerk-operated retail checkout terminal.

In an embodiment, the interaction 175-180 between the backend banking system 130 and the consumer-operated device 140 is achieved through a mobile banking application that executes on the consumer-operated device 140. In an embodiment, the Operating System (OS) of the consumer-operated device 140 permits retail push notifications and interactions even when the mobile application is actively being executed on the consumer-operated device 140, such as the iOS® OS of Apple's iPhone®. For example, the push notification causes the mobile device to beep or vibrate and display the push notification as a popup message on the phone (consumer-operated device 140) even when the phone is locked and the screen of the display is blanked out.

In an embodiment, the interaction 175-180 between the backend banking system 130 and consumer-operated device 140 is achieved through Short Messaging Service (SMS) text messages sent to the consumer-operated device 140. Here, an automated interface of the backend banking system 130 responds to text commands returned from the consumer in response to the push notification text message.

In an embodiment, the interaction 175-180 between the backend banking system 130 and the consumer-operated device 140 is achieved through an automated voice call that is responsive to the consumer's voice and/or consumer activated keys.

In an embodiment, the interaction 175-180 between the backend banking system 130 and the consumer-operated device 140 is achieved through an automated email sent to an email address of the consumer and that is response to email reply's by the consumer.

In an embodiment, the interaction 175-180 between the backend banking system 130 and the consumer operated device 140 is achieved through an automated social media service with a social media account of the consumer and that is response to messages supplied by the consumer.

In an embodiment, the consumer-operated device is one of: a tablet, a wearable processing device (such as a watch, googles, etc.), and a tablet.

In an embodiment, the push notification can be more than a binary-selected response provided by the consumer (such as allow or deny). For example, the consumer may be presented with one or multiple other accounts that the consumer has with the bank, which have sufficient funds to cover the transaction payment. The consumer can identify one or more of these other accounts to have funds transferred from those other accounts to the account that lacks the sufficient funds for the transaction payment. In an embodiment, the amount of transfer requested from one or more of these other accounts is equal to amount that when combined with the deficient account's existing balance matches the transaction payment. In an embodiment, the amount of transfer request from one or more of these other accounts, exceeds the transaction payment amount, such that when the transaction payment is made by the bank, the existing account's balance is greater than zero.

In an embodiment, the push notification is sent based on a transaction other than an overdraft transaction, such as when a minor is making a purchase with the payment card that exceeds a parent-set predefined limit for a single transaction or that exceeds a predefined limit when combined with other transactions of the minor for a parent-set time period. Here, the push notification is sent to the parent but the consumer is the minor transacting at the POS terminal 110.

In an embodiment, the processing 175-180 is a fee-based service provided as an option to the consumer. The fee structure can be period based (monthly, annual, etc.), transaction based (for each consumer transaction that triggers the processing 175-180, or for a predefined number of consumer transactions that trigger the processing 175-180 for a predefined time period), or a one-time lifetime activation fee. In an embodiment, the fee structure can be feature-based, such as a fee for the push notification allowing real-time consumer-driven authorization and denial and addition fee for ability to transfer funds between accounts in real time to cover the transaction payment.

The system of the FIG. 1A and the processing depicted in the FIG. 1B permit a variety of benefits, such as;

1) Provides control for overdraft transactions and any associated fees in the exclusive control of the consumer. As a result, the consumer is more likely to accept any fees associated with such transaction or accept a denied transaction, since the consumer made the decision in a timely fashion.
2) Provides consumers an ability to have a default processing option (perform or not perform) for overdrafts, such that the consumers can avoid responding to push notifications when it is inconvenient to do so for the consumer.
3) Provides an ability for consumers to gauge fees and manage fees in real time, such that statements are not surprises to the consumers.
4) Allows for the financial institutions to identify fraudulent activity against accounts of the consumers, because the consumer gets a push notification with the real time account details and can deny the transaction and likely alert the financial institution in real time of the fraudulent activity.
5) Provides an ability for financial institutions to build trust and loyalty relationships with their consumers.
6) Provides financial institutions greater visibility and use of payment cards (such as debit cards) with their consumers because the consumers are more likely to use the payment cards given the real-time control the consumer has over their transaction and fees.
7) Provides cross-selling and upselling opportunities for the financial institutions with their customers through increase usage by the customers of the institution's payment cards.
8) Provides a non-repudiation mechanism for consumer transactions; since consumers approve overdrafts in real time; thereby, minimizing rebates provided to retain customers for the fees.
9) Reduces consumer complaints regarding overdraft fees for support staff of financial institutions.
10) Assists financial institutions in remaining compliant with government regulations (Reg. E) by making overdraft processing and fees transparent and consumer-controlled.
11) Maintains existing interfaces as they exist with no modification between the financial institutions and their retailers' systems (the processing of the system 100) is internal to the financial institutions—the approved or denied messages between the institution and the retailer requires no modification).

These and other embodiments are now discussed with reference to the FIGS. 2-4.

Figure 2:
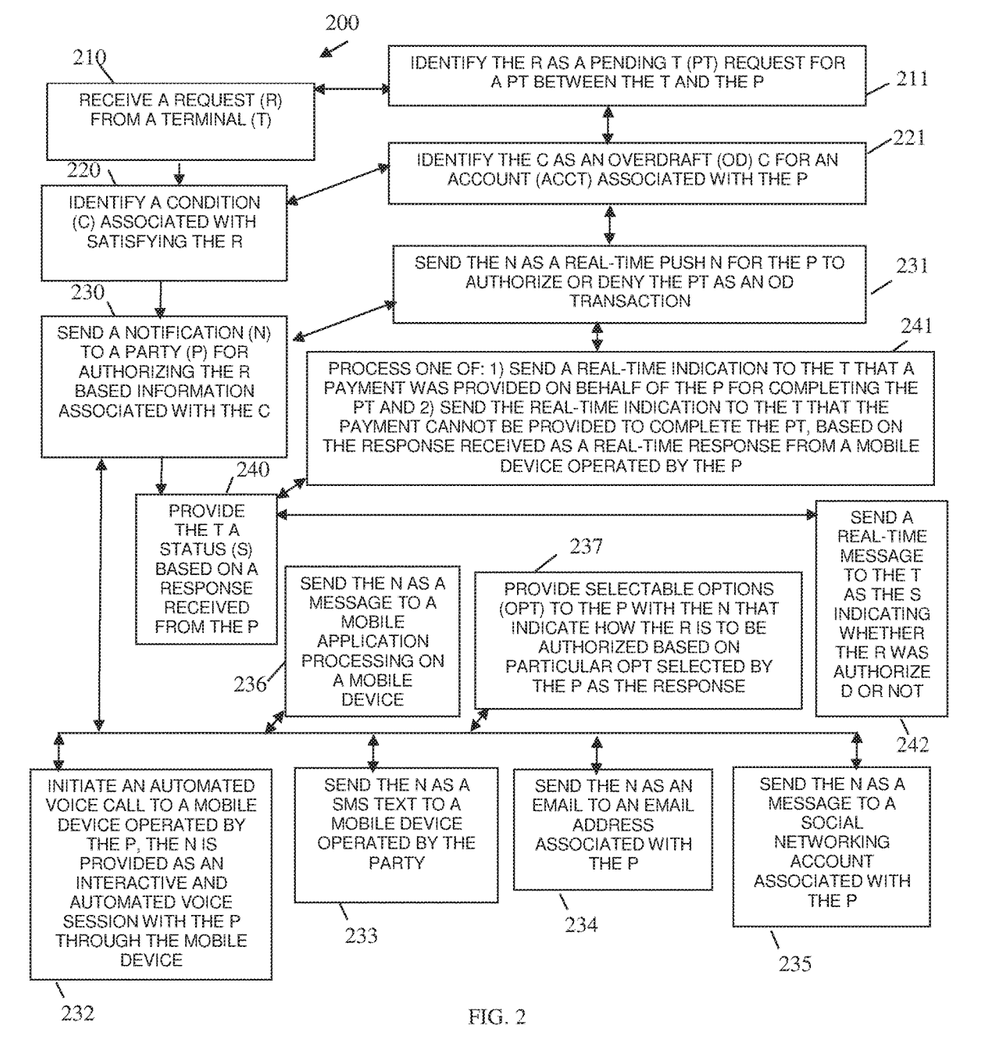
FIG. 2 is a diagram of a method for user-controlled transaction authorization processing, according to an example embodiment.

FIG. 2 is a diagram of a method 200 for user-controlled transaction authorization processing, according to an example embodiment. The software module(s) that implements the method 200 is referred to as a "real-time transaction authorizer." The real-time transaction authorizer is implemented as executable instructions programmed and residing within memory and/or a non-transitory computer-readable (processor-readable) storage medium and executed by one or more hardware processors of a hardware computing device. The processors of the device that executes the identity verifier are specifically configured and programmed to process the real-time transaction authorizer. The real-time transaction authorizer has access to one or more networks during its processing. The networks can be wired, wireless, or a combination of wired and wireless.

In an embodiment, the device that executes the real-time transaction authorizer is a hardware server that executes a backend financial system that manages a financial account of a consumer.

In an embodiment, the real-time transaction authorizer is a service integrated into the backend banking system 130.

In an embodiment, the real-time transaction authorizer performs, inter alia, the processing described above with reference to the FIG. 1B.

At 210, the real-time transaction authorizer receives a request from a terminal. In an embodiment, the terminal is the POS terminal 110. In an embodiment, the POS terminal is one of a: a SST, a kiosk, an ATM, and a clerk-operated terminal.

According to an embodiment, at 211, the real-time transaction authorizer identifies the request as a pending transaction request for a pending transaction between a party (consumer) and the terminal. In an embodiment, the pending transaction is for a retail transaction in which the party is purchasing goods and/or services from a retailer.

At 220, the real-time transaction authorizer identifies a condition associated with satisfying the request. That is, before the real-time transaction authorizer can successfully process one or more actions relevant to the request, the real-time transaction authorizer identifies a condition that needs to be satisfied.

In an embodiment of 220 and 211, at 221, the real-time transaction authorizer identifies the condition as an overdraft condition for an account associated with the party (consumer).

At 230, the real-time transaction authorizer sends a notification to the party for authorizing the request to be processed by the real-time transaction authorizer based on information associated with the condition.

In an embodiment of 230 and 221, at 231, the real-time transaction authorizer sends the notification as a real-time push notification for the party to authorize or deny the pending transaction as an overdraft transaction.

In an embodiment, at 232, the real-time transaction authorizer initiates an automated voice call to a mobile device operated by the party. The notification provided as an automated and interactive voice session with the party (between the real-time transaction authorizer and the party) through the mobile device. This can entail an automated voice interface of the real-time transaction authorizer that can recognize voice instructions provided by the party and/or recognize buttons activated by the party on the mobile device during the voice session.

In an embodiment, at 233, the real-time transaction authorizer sends the notification as a SMS text message to a mobile device operated by the party. Here, the real-time transaction authorizer includes a SMS interface to recognize text commands returned in response to the text message by the party.

In an embodiment, at 234, the real-time transaction authorizer sends the notification as an email to an email address registered to and associated with the party. The real-time transaction authorizer includes an email interface to recognize written responses returned by the party in response to the email.

In an embodiment, at 235, the real-time transaction authorizer sends the notification as a message to a social networking account associated with and registered with the real-time transaction authorizer for the party. Here, the real-time transaction authorizer includes an Application Programming Interface (API) for interacting with the party through messaging within the social networking account through a social networking website.

In an embodiment, at 236, the real-time transaction authorizer sends the notification as a message to a mobile application processing on a mobile device operated by the party. Here, the real-time transaction authorizer includes an API for interacting with the mobile application. In an embodiment, the real-time notification can cause the mobile application to wake up on the mobile device and be responsive to user instructions; this can be done through features of the OS of the mobile device as discussed above with the FIGS. 1A-1B.

In an embodiment, at 237, the real-time transaction authorizer provides selectable options to the party with the notification that indicate how the request is to be authorized and processed by the real-time transaction authorizer based on particular options selected by the party as a response to the notification.

At 240, the real-time transaction authorizer provides the terminal a status based on the response received from the party to the notification.

According to an embodiment of 240 and 231, at 241, the real-time transaction authorizer processes the request to either: 1) send a real-time indication to the terminal that a payment was provided by the real-time transaction authorizer on behalf of the party for completing the pending transaction, or 2) send the real-time indication to the terminal indicating that the payment could not be provided to complete the pending transaction. The real-time transaction authorizer processes one of the 2 actions based on the response received as a real-time response from a mobile device operated by the party.

In an embodiment, at 242, the real-time transaction authorizer sends a real-time message to the terminal as the status, which indicates whether the request was authorized and processed or whether the request was deemed unauthorized and was therefore not processed by the real-time transaction authorizer.

Figure 3:
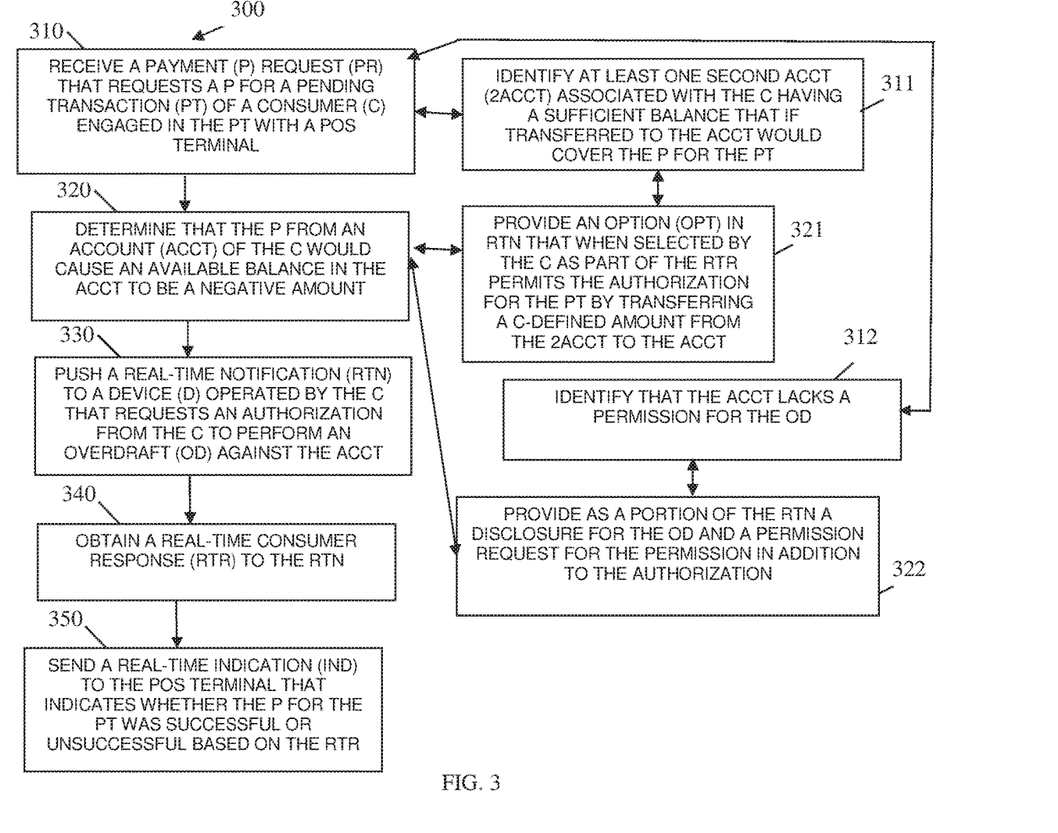
FIG. 3 is a diagram of another method for user-controlled transaction authorization processing, according to an example embodiment.

FIG. 3 is a diagram of another method 300 for user-controlled transaction authorization processing, according to an example embodiment. The software module(s) that implements the method 300 is referred to as an "interactive transaction authorizer." The interactive transaction authorizer is implemented as executable instructions programmed and residing within memory and/or a non-transitory computer-readable (processor-readable) storage medium and executed by one or more hardware processors of a hardware device. The processors of the device that executes the interactive transaction authorizer are specifically configured and programmed to process the interactive transaction authorizer. The interactive transaction authorizer has access to one or more networks during its processing. The networks can be wired, wireless, or a combination of wired and wireless.

In an embodiment, the device that interactive transaction authorizer is a hardware service that executes a financial system, which manages a financial account of a consumer. In an embodiment, the financial system is the backend banking system 130.

In an embodiment, the interactive transaction authorizer is a service of the backend banking system 130.

In an embodiment, the interactive transaction authorizer performs, inter alia, the processing described above with the FIG. 1B.

In an embodiment, the interactive transaction authorizer performs, inter alia, the processing described above with the FIG. 2.

In an embodiment, the interactive transaction authorizer performs, inter alia, some combination or all of the processing described above with the FIGS. 1B and 2.

At 310, the interactive transaction authorizer receives a payment request that requests a payment for a pending transaction of a consumer who is engaged in the pending transaction (ongoing and incomplete) with a POS terminal. In an embodiment, the POS terminal is the POS terminal 110. In an embodiment, the POS terminal 110 is one of: a SST, an ATM, a kiosk, and a clerk-operated terminal.

According to an embodiment, at 311, the interactive transaction authorizer identifies at least one second account associated with the consumer that has a sufficient balance, which if transferred would cover the payment for the pending transaction.

In an embodiment, at 312, the interactive transaction authorizer identifies that the account lacks a permission for the overdraft circumstance presented to the interactive transaction authorizer with the pending transaction request.

At 320, the interactive transaction authorizer determines that the payment from an account of the consumer would cause an available balance in the account to go negative (less than zero).

In an embodiment of 320 and 311, at 321, the interactive transaction authorizer provides an option in a real-time notification (discussed at 330 below) that when selected by the consumer as part of a consumer-provided real-time response (discussed at 340 below) permits or provides the authorization to the interactive transaction authorizer for processing the pending transaction by transferring a consumer defined amount from the second account (could be multiple second accounts) to the account.

In an embodiment of 320 and 312, at 322, the interactive transaction authorizer provides as a portion of the real-time notification (discussed at 330 below) a legal disclosure and a permission request for the interactive transaction authorizer to obtain permission for processing the overdraft in addition to and prior to processing the overdraft.

At 330, the interactive transaction authorizer pushes a real-time notification to a device operated by the consumer that requests an authorization from the consumer to perform an overdraft against the account of the consumer.

At 340, the interactive transaction authorizer obtains a real-time consumer response to the real-time notification being sent to the consumer.

At 350, the interactive transaction authorizer sends a real-time indication to the POS terminal that indicates whether the payment for the pending transaction was successful or whether the payment was not made (unsuccessful) based on the real-time indication. The consumer maintains real-time control as to whether permit overdraft processing by the interactive transaction authorizer or not permit the overdraft processing.

Figure 4:
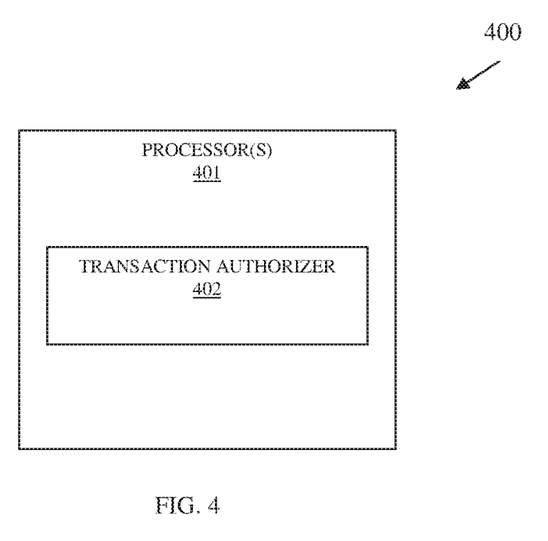
FIG. 4 is a diagram of a user-controlled transaction authorization processing system, according to an example embodiment.

FIG. 4 is a diagram of a user-controlled transaction authorization processing system 400, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements, inter alia, some combination of the processing discussed above with the FIGS. 1A-1B and 2-3.

The system 400 includes at least one hardware processor 401 and transaction authorizer 402.

The transaction authorizer 402 is configured to: execute on the processor 401; interact in real time with a POS terminal during a pending transaction with a consumer; interact in real time with a device operated by the consumer; and obtain real-time authorization from the consumer to provide a payment for the pending transaction to a retailer associated with the POS terminal through overdraft processing against an account of the consumer.

In an embodiment, the POS terminal is the POS terminal 110.

In an embodiment, the POS terminal is one of: a SST, an ATM, a kiosk, and a clerk-operated terminal.

In an embodiment, the transaction authorizer is further configured to provide an option for selection by the consumer for obtaining sufficient funds for the payment from at least one second account of the consumer. This permits interactive funds transfers between valid accounts of the consumer to handle overdraft processing in real time and within the control of the consumer.

In an embodiment, the transaction authorizer 402 is the processing reflected in the FIG. 1B.

In an embodiment, the transaction authorizer 402 is the method 200.

In an embodiment, the transaction authorizer is the method 300.

In an embodiment, the transaction authorizer 402 is all or some combination of the processing reflected in the FIGS. 1B, 2, and/or 3.

In an embodiment, of the FIGS. 1A-1B, the methods 200 and 300, and the system 400. The user-initiated transaction can be an online transaction with an online transaction system (such as through a web interface). In this instance, the permission request (transaction notification) can be sent in real time to the user from the processing (described herein) back to a separate user-operated device or the same user-operated device using a different delivery mechanism (different channel for communication) for the user's real-time permission or denial. In this embodiment, the POS terminal may be missing or may be considered to be the online transaction interface through which the user is conducting the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions that execute on a processor from a non-transitory computer-readable storage medium causing the processor to perform processing comprising:
receiving, by the processor, a request from a terminal during a transaction between the terminal and a party at the terminal;
identifying, by the processor, a condition associated with satisfying the request for the transaction;
sending, by the processor, a notification to a device being operated by the party for authorizing the request based on information associated with the condition when the party is enrolled in a protection service, wherein the device is not the terminal that is processing the transaction on behalf of the party, wherein sending further includes sending the notification as an Operating System (OS) notification that causes an OS of the device responsive to the notification to initiate a mobile application on the device with the notification and causes the device to vibrate or beep and display the notification as a popup message on the device even when the device is locked and the device screen is blanked out;
determining, by the processor, whether a response from the party is received from the device during the transaction while the party is transacting at the terminal when the party is enrolled in the protection service;
providing, by the processor, the terminal a status in real time when the response was received from the party during the transaction when the party is enrolled in the protection service, wherein providing further includes providing the status as a default action obtained from a party profile and set by the party when the response fails to be received within a configured period of time from the party, wherein the status reflects the default action as an authorization or a denial to process the transaction, and the status is expected as the authorization or the denial by an existing interface of the terminal, wherein the existing interface is between the terminal and a financial institution associated with the protection service, wherein providing further includes providing the status via the existing interface of the terminal:

providing, by the processor, real-time control to the party during the transaction over whether to accept the condition for the transaction to complete the transaction at the terminal or whether to deny the condition for the transaction to cancel the transaction at the terminal when the party is enrolled in the protection service through interaction with the device operated by the party; and notifying, by the processor, the terminal through the existing interface of the status associated with the denial of the transaction when the party is not enrolled in the protection service; and processing the method without modifications to the existing interface between the terminal and the Hall financial institution associated with providing the protection service, and wherein the existing interface expects the status having a value associated with the authorization or the denial and the method provides the status as expected during the transaction to the terminal through the existing interface.

2. The method of claim 1, wherein the receiving further includes identifying, by the processor, the request as a pending transaction request for the transaction between the terminal and the party.

3. The method of claim 2, wherein the identifying the condition further includes identifying, by the processor, the condition as an overdraft condition for an account associated with the party.

4. The method of claim 3, wherein the sending further includes sending, by the processor, the notification as a real-time push notification for the party to authorize or deny the transaction as an overdraft transaction.

5. The method of claim 4, wherein the providing further includes one of:

1) sending, by the processor, a real-time indication to the terminal that a payment was provided on behalf of the party for completing the transaction and 2) sending, by the processor, the real-time indication to the terminal that the payment cannot be provided to complete the transaction, based on the response received as a real-time response from a mobile device operated by the party.

6. The method of claim 1, wherein the sending further includes providing, by the processor, selectable options to the party with the notification that indicate how the request is to be authorized based on particular options selected by the party as the response.

7. The method of claim 1, wherein the providing further includes sending, by the processor, a real-time message to the terminal as the status indicating whether the request was authorized or whether the request was denied.

8. A method, comprising:

providing executable instructions that execute on a processor from a non-transitory computer-readable storage medium causing the processor to perform processing comprising;

receiving, by the processor, a payment request that requests a payment for a pending transaction of a consumer engaged in the pending transaction with a Point-Of-Sale (POS) terminal;

determining, by the processor that the payment from an account of the consumer would cause an available balance in the account to be a negative amount;

pushing, by the processor a real-time notification to a device operated by the consumer that requests an authorization from the consumer to perform an overdraft against the account when the consumer is enrolled in a protection service, wherein the device is not the POS terminal, wherein the device is a mobile device operated by the consumer, and wherein pushing further includes sending the real-time notification as an Operating System (OS) notification that causes the OS of the device responsive to the real-time notification to initiate a mobile application on the device with the real-time notification and causes the device to vibrate or beep and display the real-time notification as a popup message on the device even when the device is locked and the device screen is blanked out;

obtaining, by the processor a real-time consumer response to the real-time notification during the pending transaction when the consumer is enrolled in the protection service;

sending, by the processor a real-time indication to the POS terminal that indicates whether the payment for the pending transaction was successful via a status having a value of authorized or was unsuccessful via the status having the value of denied based on the real-time consumer response during the pending transaction when the consumer is enrolled in the protection service, wherein sending further includes providing the real-time indication as a default action obtained from a consumer profile and set by the consumer when the real-time consumer response fails to be obtained within a configured period of time from the consumer, wherein the default action comprises the value for the status associated with the real-time indication, wherein the value of authorized or denied is expected in the real-time indication by an existing interface of the terminal, wherein the existing interface is between the terminal and a financial institution associated with the protection service, where sending further includes sending the value for the status with the value of authorized or denied through the existing interface to the terminal;

providing, by the processor real-time control to the consumer during the pending transaction over whether to accept the overdraft for the pending transaction to complete the pending transaction at the POS terminal or whether to deny the overdraft for the pending transaction to cancel the pending transaction at the POS terminal when the consumer is enrolled in the protection service, through the mobile device operated by the consumer;

notifying, by the processor, the POS terminal through the existing interface to deny processing the pending transaction via the real-time indication associated with the status having the value of denied when the consumer is not enrolled in the protection service by providing the POS terminal the real-time indication having the status with the value of denied through the existing interface;

processing the method without modifications to the existing interface between the POS terminal and the nail financial institution associated with providing the protection service, and wherein the existing interface expects the status having a value of authorized or denied and the method provides the status as expected during the transaction to the terminal via the real-time indication using the existing interface.

9. The method of claim 8, wherein the determining further includes identifying, by the processor at least one second account associated with the consumer having a sufficient balance that if transferred to the account would cover the payment for the pending transaction.

10. The method of claim 9, wherein the pushing further includes providing, by the processor an option in the real-time notification that when selected by the consumer as part of the real-time consumer response permits the authorization for the pending transaction by transferring a consumer-defined amount from the at least one second account to the account.

11. The method of claim 8 wherein the determining further includes identifying, by the processor that the account lacks a permission for the overdraft.

12. The method of claim 11, wherein the pushing further includes providing, by the processor as a portion of the real-time notification a disclosure for the overdraft and a permission request for the permission in addition to the authorization.

13. A system, comprising:
   a non-transitory computer-readable storage medium having executable instructions representing a transaction authorizer; a hardware processor; and
   the transaction authorizer executed by the hardware processor from the non-transitory computer-readable storage medium causing the hardware processor to perform processing comprising:
   interacting in real time with a Point-Of-Sale (POS) terminal during a pending transaction with a consumer, wherein the consumer is performing the pending transaction at the POS terminal,
interacting in real time with a device operated by the consumer when the consumer is enrolled in a protection service, wherein the device is not the POS terminal, wherein the device is a mobile device operated by the consumer, and wherein an Operating System (OS) notification is sent to the device that causes an OS of the device responsive to the notification to initiate a mobile application on the device with the notification and causes the device to vibrate or beep and display the notification as a popup message on the device even when the device is locked and the device screen is blanked out;
   obtaining real-time authorization from the consumer to provide a payment for the pending transaction to a retailer associated with the POS terminal through overdraft processing against an account of the consumer during the pending transaction between the consumer and the POS terminal when the consumer is enrolled in the protection service;
   providing a status having a value of authorized or denied to the POS terminal based on a default action obtained from a consumer profile and set by the consumer for the pending transaction when the real-time authorization fails to be obtained from the consumer within a configured period of time when the consumer is enrolled in the protection service, wherein an existing interface of the POS terminal expects the status with the value of authorized or denied, wherein the existing interface is between the POS terminal and a financial institution associated with the protection service, wherein providing further includes providing the status with the value of authorized or denied through the existing interface to the POS terminal;
   providing real-time control to the consumer during the pending transaction at the POS terminal over whether to perform the overdraft processing and complete the pending transaction at the POS terminal or whether to cancel the pending transaction at the POS terminal when the consumer is enrolled in the protection service through the mobile device;
   notifying the POS terminal to deny processing of the pending transaction by providing the status with the value of denied to the POS terminal through the existing interface when the consumer is not enrolled in the protection service; and
   processing the executable instructions, by the hardware processor, without modifications to the existing interface between the POS terminal and the nail financial institution associated with providing the protection service, wherein the existing interface expects the status having a value of authorized or denied and the method provides the status with the value as expected during the transaction to the POS terminal through the existing interface.

14. The system of claim 13, wherein the POS terminal is one of: a Self-Service Terminal (SST), an Automated Teller Machine (ATM), a kiosk, and a clerk-operated terminal.

15. The system of claim 13, wherein the executable instructions executed by the hardware processor from the non-transitory computer-readable storage medium further causing the hardware processor to perform additional processing comprising providing an option for selection by the consumer for obtaining sufficient funds for the payment from at least one second account of the consumer.

* * * * *